United States Patent [19]

Pechev et al.

[11] 4,111,548

[45] Sep. 5, 1978

[54] APPARATUS FOR ADDITIVE LIGHT MIXING

[75] Inventors: Miloslav Ivanov Pechev; Varban Petrov Shentov, both of Sofia, Bulgaria

[73] Assignee: Directzia "Uchebno-Technicheski Sredstva", Sofia, Bulgaria

[21] Appl. No.: 764,468

[22] Filed: Jan. 31, 1977

[30] Foreign Application Priority Data

Jan. 30, 1976 [BG] Bulgaria .................................. 32237

[51] Int. Cl.[2] ..................... G03B 27/52; G03B 27/54; G03B 27/76
[52] U.S. Cl. ...................... 355/30; 355/37; 355/70
[58] Field of Search ...................... 355/32, 37, 70, 30

[56] References Cited

U.S. PATENT DOCUMENTS

| | | | |
|---|---|---|---|
| 2,415,568 | 2/1947 | Simmon et al. | 355/37 |
| 2,438,219 | 3/1948 | Johnston | 355/37 |
| 2,447,724 | 8/1948 | Weisglass | 355/37 |
| 3,488,117 | 1/1970 | Weisglass | 355/37 |
| 3,684,371 | 8/1972 | Weisglass et al. | 355/37 X |
| 3,950,093 | 4/1976 | Schneider | 355/37 |

*Primary Examiner*—Richard A. Wintercorn

[57] ABSTRACT

A method for additive mixing of colors wherein different colored light beams are mixed after being reflected from a rotating reflecting device. An apparatus for additive color mixing comprising sources of different colored light beams with devices for controlling their intensity, a mixing chamber and a device for cooling the system wherein, in the mixing chamber and opposite the light sources there is provided a rotating reflection device secured on a shaft which is rotatable and which reflection device has cooling vanes or fins formed on its periphery.

5 Claims, 2 Drawing Figures

APPARATUS FOR ADDITIVE LIGHT MIXING

SUMMARY OF THE INVENTION

The invention relates to a method of and apparatus for additive mixing of lights and, more particularly, for producing a variable in the limits of the visible spectrum of color light, used in color photography for illuminating, photographing, copying of still or motion color picture transparencies, enlarging color transparencies, projecting color diapositives, as well as for stage and other color light effects.

It is well-known in the photographic art that color film and positive print paper may vary from batch to batch in terms of color balance. That may result from the different basic filtration of the positive color paper, the transparent mask used, illuminating defects, the deviation in color temperature of light sources, the deviation in exposure time, long and incorrect storage and use of photographic materials, wrong processing and the like. There fore, it is a common practice to test the film paper combination for color balance before making positive prints.

The deviations due to illumination and exposure are eliminated by additional corrections. In both cases the correction is made through adjusting the light intensity and duration of the printing, enlarging or projecting apparatus to achieve the color balance or desired color effects.

The most common system for color balancing of a light source is to use a set of yellow, cyan and magenta filters according to the so-called substractive method. Major disadvantages of this method are the great number of, usually a set of 11, filters for each of the three basic substractive colors and the fact that the filters are costly, short-lived, and capable of allowing only incremental step adjustments in color.

To avoid said disadvantages of the substractive light balancing methods, recently the so-called additive method has been increasingly used wherein individual sources of red, green and blue light are combined or additively mixed to produce "white" light. One advantage of this system is that the color of the composed light may be continuously varied over a wide range of colors by varying the amounts of the three primary colors being used to illuminate the negative either by varying the voltage or by using variable diaphragms, or by varying color exposure time, thus eliminating the use of a plurality of color filters and, to a greater extent, enabling automatic adjustment of color balance through well known adjusting systems.

Although the additive approach has a great number of advantages over the substractive method generally, the inefficiency of known additive systems occurs at the point where the three primary colors are mixed or combined.

The well-known additive light mixing systems are built up on several basic principles. Some systems use reflecting devices for mixing the red, green and blue light beams, such as interference reflectors, semi-transparent reflectors, frosted glass plates such as diffusors and the like. Other systems employ an integrating sphere or dome drum or prism for combining the light by multiple internal reflections. Application has been made also of fiber optic light-mixing devices each having input ends for receiving the red, green and blue light beams and a composed output end from which the three primary color lights are transmitted to intermix to form light of a composed color. Some systems use one light source, the light of which is divided and after adjusting anew, mixed by known methods. Cathode ray tubes are employed also as light sources.

Each of the above-mentioned mixing systems is a relatively low-efficiency light-transmitting system. In order to provide adequate light levels at the negative for short exposure times, high power lamps must be employed at the input end of the mixing devices. This in turn causes excessive heat to be generated within the lighting system. The heat problem either limits the size of the lamps that can be used, thereby extending exposure time, or requires that complex heat-reducing or cooling aids be built into the systems. Another disadvantage of the existing light mixing systems inclues the special requirements as to the quality of production and maintenance of the optical component parts, i.e., lenses, filters, reflectors, etc., and due to the static character of the systems, defects and spots on their surfaces give a greater impression on the film print. This results in more expensive systems and renders more complicated exploitation which is not suitable for mass production and broad usage by photographers.

It is an object of this invention to provide a system for additive light mixing which has not succumbed to the above-mentioned disadvantages of known light mixing systems.

According to the method of the invention, the mixing of the different colored light beams is accomplished mainly through the reflection of such light beams from a rotating reflection member in the direction of the object to be illuminated.

According to the present invention, the apparatus for additive light mixing comprises a mixing chamber with individual beams from red, green and blue light sources arranged around and obliquely to a rotating reflection means, which reflects the light beams mainly in the desired direction of illumination, a direction which coincides essentially with the direction of the axis of rotation.

The number of light sources preferably corresponds at least to the basic red, green and blue colors of additive light mixing and, if required, may use more than one source of each light color, arranged symmetrically in relation to the chamber opening; additional white light sources may also be used. Also well-known in the photographic art are red, green and blue luminescent or low voltage lamps for use as color light sources which are provided with reflectors for adjustably directing the light beams toward the rotating reflection means. For this purpose, white light lamps with color casings, color filters or color reflectors may be used.

Apart from rotating reflection means, for a major utilization of light and for its greater homogeneity, the internal surface of the housing is coated with a reflecting layer. Thus the light mixing becomes so homogeneous and diffused that the system may be used without a condensor lens, utilizing only a frosted glass for contact printing.

For attaining the required color balance, there are provided well-known means for intensity variation of individual light sources having provisions for the maintenance of the total mixed light intensity. The variation may be achieved manually for any individual lamp with graduated knobs or with a suitable interengaged system, which may be adapted for distant or remote control, or automatic control through well-known circuit arrangements.

In order to rotate the reflecting means, there is provided a shaft connection by means of a support to the rotor of an electric motor which is centrally secured on the top of the light mixing chamber housing.

For cooling the light mixing system and the low-voltage transformer if it is built into the apparatus, there are vanes radially and fixedly secured on the rotating reflection means support periphery.

The lighting system, when used as an attachment to an enlarger or printer, may be provided at the output side with fittings for removably joining it to a commonly known enlarger optical system with a bayonet catch or screw assembly.

The light mixing system according to the invention enables the production of a comparatively effective, simple, sturdy and overloadable construction using powerful light sources, which are due to highly diffused, unstatic pulsating light beams dispersed from the rotating reflection means, which eliminate the influences of local defects and dust thanks to suction effects of the vanes which simultaneously cool the whole system. The ability to easily control the intensity of the individual light beams from zero to the maximum enables a smooth change of the light color from one to another within the limits of the visible spectrum, a highly desirable result especially when considering stage light effects and other color light effects. The mixing system may be used successfully, for example, in color film copying apparatus, motion picture copying apparatus as well as in projection and illumination apparatus to obtain stage light and other color light effects.

BRIEF DESCRIPTION OF THE DRAWING

The invention is further set forth in the following detailed description as well as in the accompanying drawings, in which.

DETAILED DESCRIPTION

Figures 1, 2:
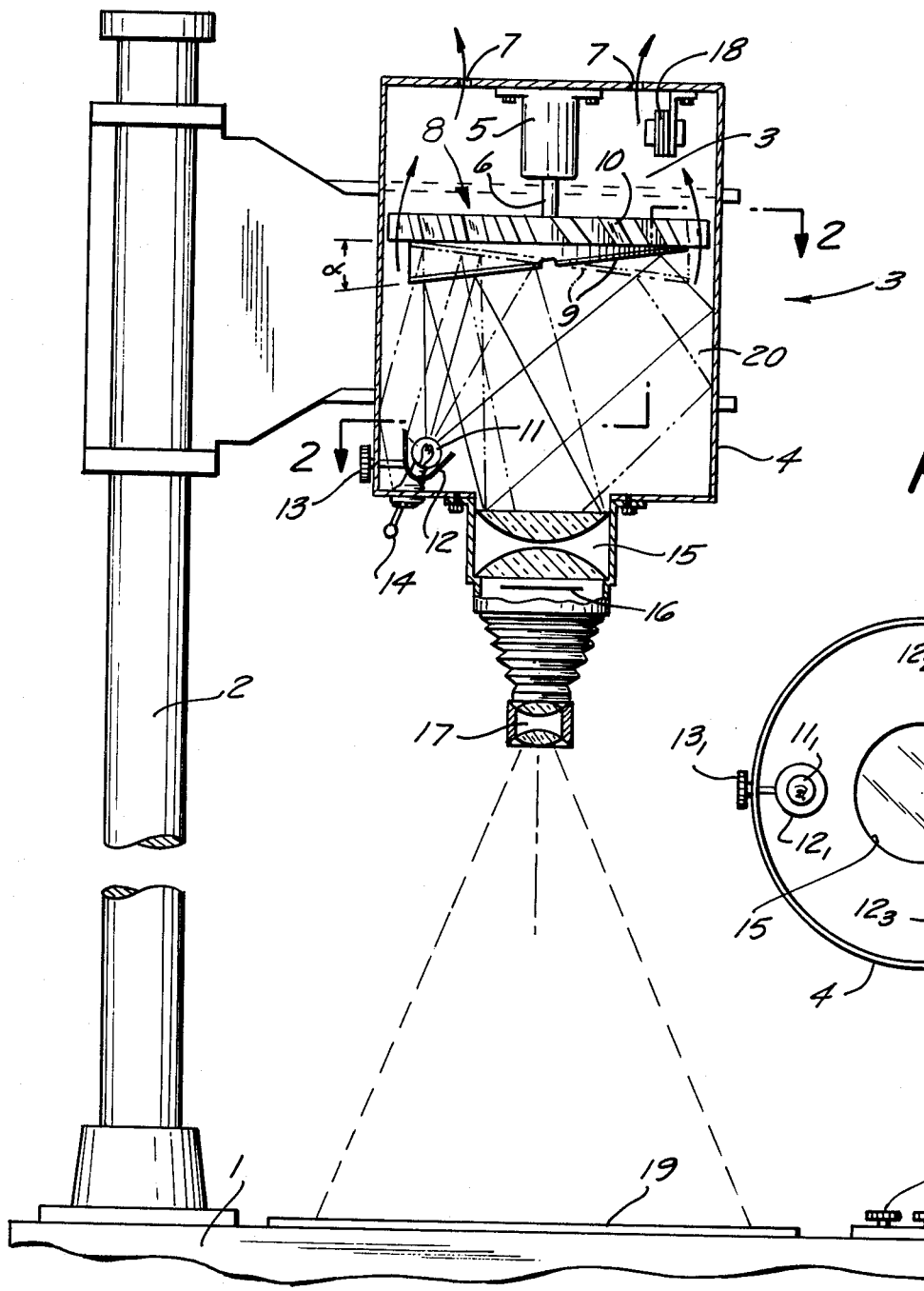
FIG. 1 shows schematically one particular form of the apparatus according to the present invention in a side sectional view.
FIG. 2 shows a sectional view along line I—I of FIG. 1.

As best seen in FIG. 1, the apparatus of the present invention includes a projection head 3 movably mounted on the rod 2 which is secured to the plate 1 of an enlarger apparatus. On the rotor shaft 6 of the electric motor 5, which is centrally mounted on the top of the housing 4, is mounted oblique to a reflection mirror 9 by means of the support 8. The shaft 6 is disposed with its axle vertical as shown in FIG. 1; the broad surface of the reflection mirror 9 is disposed at an angle α with respect to the horizontal. The periphery of the support 8 is provided with vanes 10. The reflecting mirror 9 is directed towards the colored light sources 11 provided with adjusting levers 14 of reflectors 12 for directing the light beams upon the rotating reflection mirror 9 from which the reflected light beams fall mainly into the condenser lens opening 15. For controlling the intensity of the light sources 11, there are provided graduated knobs 13 or 13' for remote control. On the top of the apparatus or outside the apparatus is mounted a low-voltage transformer 18 for the light sources and the motor power supply. The inside surfaces of the housing 4 are formed as reflecting surfaces. The electric motor has a variable speed control. Vibration and noise control are achieved by devices well-known in the art.

In operation the rotating reflection mirror passes all possible positions included in the angle α and thus forms an oscillating pulse reflection plane, the greater part of the light beams being reflected in a moment from the rotating reflection mirror 9 and reaching the condenser lens opening 15 and the other part reflected from the walls and after multiple reflection from the mirror 9 and the walls reach again the condenser opening 15. A line perpendicular to the condenser lens defines an optical axis. Dotted lines show the light beams after turning the rotating reflection mirror 180°. Thus a full dynamic mixing of color light beams of different light sources is attained. From the condenser lens 15 the light beams converge into the objective lens 17 and are directed to the copying frame 19. When a negative 16 is placed behind the condenser lens, it will be uniformly illuminated and thus projected on the color paper positioned over the frame. The heated air is pumped out from the mixing chamber by means of the vanes and exits through the appertures 7 on the top of the housing, thus simultaneously cooling the transformer 18, if desired, on the top of the housing.

Although the invention has been illustrated and described with reference to one preferred embodiment thereof, it is to be expressly understood that it is in no way limited by the disclosure of such a preferred embodiment, but is capable of numerous modifications within the scope of the appended claims.

What is claimed is:

1. Apparatus for mixing light from a plurality of sources each of which provides a different color light, said apparatus comprising reflection means for reflecting light from said sources along an optical axis, means for rotating said reflection means about said axis, said reflection means being adapted to provide a maximum reflection from said sources in sequence during each rotation thereof, a converging lens arrangement, a negative receiver positioned along said optical path, said reflection means having a reflecting surface mounted obliquely with respect to said axis for directing a bulk of reflected light therefrom to said lens arrangement, said reflecting internal surface being adapted to redirect the remainder of the light from said reflection means to said lens arrangement, said reflection means being affixed to a support having cooling vanes about its periphery and mounted on a shaft of a motor which shaft is aligned with said axis, and/a housing containing the above-recited apparatus, said housing having a reflecting internal surface.

2. Apparatus in accordance with claim 1, wherein each of said sources include means for varying the intensity of the light emitted therefrom.

3. Apparatus in accordance with claim 2, wherein at least sources of red, green, and blue light are spaced apart from one another in a plane normal to said axis and equidistant from said axis.

4. Apparatus in accordance with claim 3, wherein each of said light sources has control means connected thereto for varying the attitude of said source with respect to said reflecting means.

5. Apparatus for mixing light comprising a plurality of sources each of which provides a different color light, reflection means for reflecting light from said sources along an optical axis, means for rotating said reflection means about said axis, said reflection means being adapted to provide a maximum reflection from said sources in sequence during each rotation thereof, a converging lens arrangement, a negative receiver positioned along said optical path, said reflection means having a reflecting surface mounted obliquely with respect to said axis for directing a bulk of reflected light therefrom to said lens arrangement, said reflecting internal surface being adapted to redirect the remainder of the light from said reflection means to said lens arrangement, and a housing containing the above-recited apparatus, said housing having a reflecting internal surface.

* * * * *